March 16, 1926.
M. D. DOMINGUEZ
VEHICLE BUMPER
Filed April 4, 1925
1,576,728
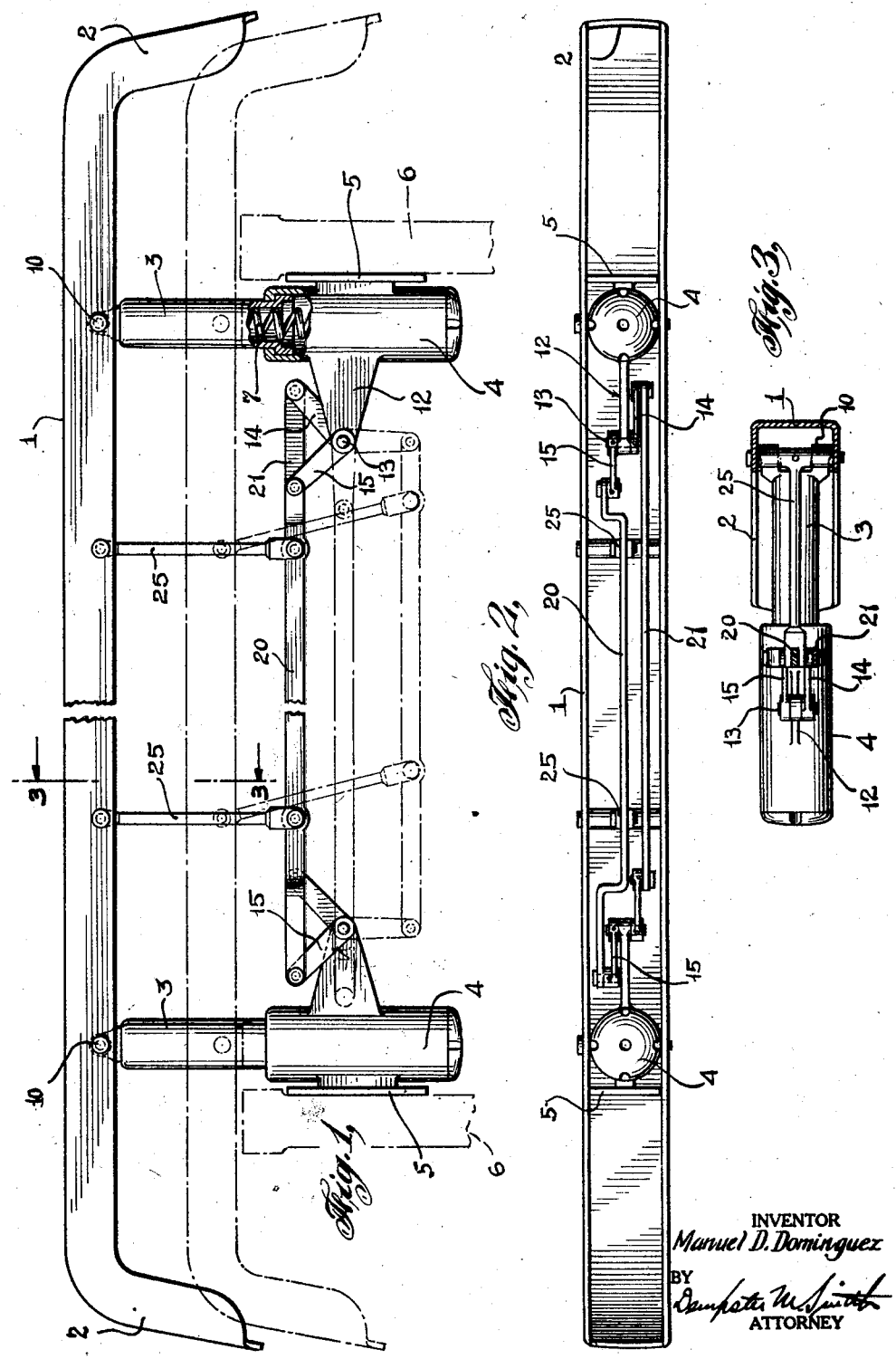
INVENTOR
Manuel D. Dominguez
BY
ATTORNEY Patented Mar. 16, 1926.

1,576,728

UNITED STATES PATENT OFFICE.

MANUEL D. DOMINGUEZ, OF NEW ORLEANS, LOUISIANA, ASSIGNOR TO CHARLES A. DENIS AND GEORGE SARPY, BOTH OF NEW ORLEANS, LOUISIANA.

VEHICLE BUMPER.

Application filed April 4, 1925. Serial No. 20,646.

*To all whom it may concern:*

Be it known that I, MANUEL D. DOMINGUEZ, a citizen of Spain, and resident of New Orleans, in the parish of Orleans and State of Louisiana, have invented certain new and useful Improvements in Vehicle Bumpers, of which the following is a specification.

My invention relates to vehicle fenders, usually called bumpers.

The general object is to provide a yieldingly supported impact member which will protect the vehicle on which it is mounted, or objects encountered, from impacts of considerable force.

A more particular object is to provide an impact member or bar with controlling or guiding mechanism by which the bar in moving under pressure or impact maintains positions which are always parallel to its original or normal position, and which also causes both of the two yieldable bumper supports to act in resisting pressure or impact, when it is applied to a central part or toward either end of the impact member.

The characteristics and advantages of the invention are further sufficiently explained in connection with the following detail description of the accompanying drawing, which shows an exemplifying embodiment of the invention. After considering this, persons skilled in the art will understand that many variations may be made within the principles of the invention, and I contemplate the employment of any structures that are properly within the scope of the appended claims.

Fig. 1 is a plan view of bumper mechanism embodying the invention in one form.

Fig. 2 is a rear elevation.

Fig. 3 is a sectional detail in the plane 3—3, Fig. 1.

The impact bar 1 may be of almost any suitable form. In the present example it is of channel section with a long, straight, central portion and rearwardly curved ends 2, to more effectively protect the wheels or wheel guards of a vehicle. The impact bar is yieldingly supported, preferably at two points. The supporting means may vary considerably. In the present example they consist of plungers or pistons 3 arranged to move in guides or cylinders 4, which have brackets 5 suitable for connection to vehicle frame members such as 6 (indicated in dotted lines); or intermediate brackets may be provided as necessary or desirable, depending on the frame construction and desired bumper location. Springs 7 within the cylinders and pistons provide yielding resistance to rearward movement of the bar. In addition the piston movement may be resisted by pneumatic or hydraulic mediums. My co-pending application, Ser. No. 744,938, shows combined spring and pneumatic means for resisting bar movement, and such mechanism may be employed for the present purpose, or practically any other mechanism may be employed which provides the proper yielding resistance and also permits parallel movement of the bar.

The pistons or plungers 3 are preferably pivotally connected to the impact bar by pins or bolts 10 passing through the horizontal bar flanges. This arrangement permits slight angular movement of the bar in relation to the plungers and so avoids any angular strain on the plungers or cylinders, although there is no considerable angular movement, since the bar is guided for parallel movement, as presently explained.

The cylinders are provided with inwardly-extending brackets 12, the ends of which provide bearings for short shafts 13. An arm 14 is rigidly connected to the lower end of each shaft and another arm 15 is similarly connected to the upper end of each shaft. These arms are usually at 90° angles to each other and each group, consisting of a shaft 13 with its arms 14 and 15, constitutes practically a bell-crank. The two upper arms 15 are connected by a transverse link 20 and the lower arms 14 are connected by a transverse link 21. One of these links, for example, the upper link 20, is connected at two points relatively near its ends with the bumper bar by struts or rods 25, which are normally parallel to the plungers 3 and have articulated connections with the link 20 and the bumper bar.

When the bar 1 encounters an obstacle with sufficient force to move it toward the vehicle, this movement is yieldingly resisted by the plungers 3 and their springs 7 or other resisting means which may be employed. If the impact occurs considerably to one side of the longitudinal center line of the vehicle, which would ordinarily cause the bar to be deflected angularly, any such movement is substantially prevented by the linkage, including the bell cranks, links 20 and 21 and struts 25, which co-operate to compel the bar to move always parallel to its original position. Thus upon any substantial movement of the bumper bar the two struts 25 cause the upper cross link 20 to move back in parallel relation to the bar and to its original position; link 20 at the same time moves to the left and actuates the bell cranks so that the lower link 21 moves to the left and rearward, and aids in controlling the bell crank movement, or prevents any displacement of the bell cranks which might otherwise permit link 20 and the bumper bar to assume angular positions. Finally, in the case of a severe impact, the parts assume the position shown in dotted lines in Fig. 1, which will sufficiently explain the action without further detail description.

The described means for causing the bumper bar to maintain always a position parallel to its normal position, not only better protects the vehicle or obstacles from injury, but the linkage acts when any force is applied to the bar relatively near one end, to distribute this force substantially equally between the two yieldable supports or resisting devices, represented in this case by the plungers 3 and cylinders 4 with their springs or other resisting means. The available resistance to impact occurring at points remote from the center of the impact bar is therefore practically doubled, as compared with ordinary arrangements, in which such forces are resisted only by the spring or other device located near one end of the bar.

I claim:

1. A vehicle bumper comprising guides adapted for connection to vehicle members, plungers arranged to move in the guides, yieldable means to resist plunger movement, an impact bar connected to the plungers, brackets on the guides, bell cranks pivotally mounted in the brackets, links connecting similar arms of the respective bell cranks, and struts pivotally connected to one of the links and to the impact bar to compel the latter to assume positions parallel to its normal position and to distribute impact forces substantially equally to the resisting means.

2. A vehicle bumper comprising cylinders adapted for connection to vehicle members, plungers in the cylinders, means urging the plungers outward, a bumper bar connected to the plungers, brackets on the cylinders, bell cranks pivotally mounted in the brackets and each having an upper and a lower arm disposed substantially at right angles to each other, a cross link connecting the upper bell crank arms, a cross link connecting the lower bell crank arms, and parallel longitudinal struts pivotally connected to one of the cross links and to the bumper bar to guide the latter in parallel relation to its normal position and distribute impact forces substantially equally to the plungers and springs.

Signed at New Orleans in the parish of Orleans and State of Louisiana this 9th day of March, A. D. 1925.

MANUEL D. DOMINGUEZ.